US009517726B1

(12) United States Patent
Murray et al.

(10) Patent No.: US 9,517,726 B1
(45) Date of Patent: Dec. 13, 2016

(54) VEHICLE CARGO ORGANISER

(71) Applicant: Ford Global Technologies, LLC, Dearborn, MI (US)

(72) Inventors: Andrew J. Murray, Colchester (GB); Sebastian Rieger, Stuttgart (DE); Alicia Agius, Romford (GB); Stephen David Fleming, Hockley (GB); Ed Stubbs, London (GB); Jonathan Mundy, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/172,516

(22) Filed: Jun. 3, 2016

Related U.S. Application Data

(62) Division of application No. 14/291,439, filed on May 30, 2014, now Pat. No. 9,381,871.

(30) Foreign Application Priority Data

May 31, 2013 (GB) .................................. 1309720.9

(51) Int. Cl.
*B60R 11/00* (2006.01)
*B60R 7/02* (2006.01)
*B60R 5/04* (2006.01)

(52) U.S. Cl.
CPC . *B60R 7/02* (2013.01); *B60R 5/04* (2013.01); *B60R 11/00* (2013.01); *B60R 2011/0036* (2013.01); *B60R 2011/0075* (2013.01); *B60R 2011/0084* (2013.01)

(58) Field of Classification Search
CPC .... B60R 7/02; B60R 11/00; B60R 2011/0036; B60R 2011/0084; B60R 5/04

USPC ....................................................... 296/37.14
See application file for complete search history.

(56) References Cited

U.S. PATENT DOCUMENTS

| | | |
|---|---|---|
| 1,585,871 A | 2/1925 | Pels |
| 4,226,348 A | 10/1980 | Dottor et al. |
| 4,540,213 A | 9/1985 | Herlitz et al. |
| 4,690,583 A | 9/1987 | Faulconer |
| 5,035,184 A | 7/1991 | Bott |
| 5,161,700 A | 11/1992 | Stannis et al. |
| 5,484,091 A | 1/1996 | Malinowski et al. |
| 5,492,257 A | 2/1996 | Demick |
| 5,520,316 A | 5/1996 | Chen |
| 5,538,148 A | 7/1996 | Indyk |
| 5,667,120 A | 9/1997 | Bieck et al. |
| 5,855,291 A | 1/1999 | Ingle |
| 5,967,584 A | 10/1999 | McCarthy et al. |
| 6,041,987 A | 3/2000 | Tickoo |
| 6,050,202 A | 4/2000 | Thompson |

(Continued)

FOREIGN PATENT DOCUMENTS

DE 0738626 A1 * 10/1996 ............ B60P 7/0815

OTHER PUBLICATIONS

UK Search Report, Nov. 14, 2013 (4 pages).

*Primary Examiner* — Pinel Romain
(74) *Attorney, Agent, or Firm* — Vichit Chea; Bejin Bieneman PLC

(57) ABSTRACT

A cargo organizer for a vehicle includes a frame at least partially forming a floor of a cargo area of the vehicle. The cargo organizer includes one or more elongate elements extendable across an opening defined by the frame. The elongate elements are slidable with respect to the frame.

14 Claims, 13 Drawing Sheets

(56) References Cited

U.S. PATENT DOCUMENTS

| | | | |
|---|---|---|---|
| 6,053,553 A | 4/2000 | Hespelt | |
| 6,308,873 B1 * | 10/2001 | Baldas | B60R 7/02 217/15 |
| 6,502,886 B1 | 1/2003 | Bleau et al. | |
| 6,752,304 B1 | 6/2004 | Hotary et al. | |
| 6,811,196 B2 | 11/2004 | Gammon | |
| 6,942,270 B1 * | 9/2005 | Mulvihill | B60R 7/02 220/6 |
| 7,201,421 B2 | 4/2007 | Reynolds et al. | |
| 7,322,629 B2 | 1/2008 | McClintock | |
| 8,057,141 B2 | 11/2011 | Bernhardsson et al. | |
| 8,215,693 B2 | 7/2012 | Ulita | |
| 8,540,299 B2 | 9/2013 | Quiros Perez et al. | |
| 2006/0022479 A1 | 2/2006 | Mulvihill et al. | |
| 2006/0290157 A1 | 12/2006 | Bohlke et al. | |
| 2014/0054917 A1 | 2/2014 | Tosco et al. | |

* cited by examiner

VEHICLE CARGO ORGANISER

CLAIM OF PRIORITY

The subject patent application is a divisional application of, and claims priority to, U.S. patent application Ser. No. 14/291,439 filed May 30, 2014, which claims priority to United Kingdom Patent Application No. 1309720.9 filed May 31, 2013, both of which are herein incorporated by reference in their entirety.

The present disclosure relates to a cargo organiser for a vehicle, in particular, but not exclusively, a cargo organiser comprising a frame and one or more slidable elongate elements.

BACKGROUND

The load compartment in an automobile often comprises a single open space. Whilst this may be practical for large items, it is not best suited to small, fragile or unstable items, which tend to fall over or slide around during the course of normal driving.

Previously-proposed systems for securing such items are varied and come with their own disadvantages. For example, nets can be difficult to use and may only retain items of a certain type and/or size. Other systems may also take up valuable cargo space.

By way of example, U.S. Pat. No. 4,540,213 discloses a vehicle cargo organiser assembly with a plurality of parallel slats, ends of which are secured by a transverse cross-rail. However, the assembly disclosed in U.S. Pat. No. 4,540,213 is not configurable to the load and is relatively flimsy.

The present disclosure seeks to address these issues.

SUMMARY

According to an aspect of the present disclosure there is provided a cargo organiser for a vehicle, the cargo organiser comprising: a frame; and one or more elongate elements extendable across an opening defined by the frame, wherein the elongate elements are slidable with respect to the frame.

The frame may at least partially form a floor of a cargo area of the vehicle. The frame may be movable with respect to the cargo area of the vehicle.

The elongate elements may comprise a locking mechanism provided at one or each end of the elongate element. The locking mechanism may be configured to lock the position of the elongate element with respect to the frame. The locking mechanism may be configured to be releasable when the elongate element is depressed relative to the frame.

The cargo organiser may further comprise a plurality of rotatably coupled panels extending across the frame opening. The panels may be rotatably coupled to one another, e.g. in succession.

The plurality of rotatably coupled panels may be provided adjacent to at least one of the elongate elements. The plurality of rotatably coupled panels may be provided between a pair of elongate elements.

The rotatably coupled panels may be disposed such that the rotatably coupled panels may rotate with respect to each other about an axis parallel to a longitudinal axis defined by the elongate element. For example, a hinge coupling the rotatably coupled panels together may be disposed with an axis of rotation parallel to a longitudinal axis defined by the elongate element.

The elongate elements may comprise a handle. The handle may be formed by an opening in the elongate element.

The frame may be rotatable with respect to the cargo area of the vehicle. The frame may be movably, e.g. rotatably, coupled to the cargo area of the vehicle. The frame may be configured such that the frame rotates with respect to the cargo area about an axis perpendicular to a longitudinal axis defined by the elongate element.

The frame may comprise a panel and the panel may comprise the opening. The panel may be substantially flat. The frame may be configured so that it may be substantially flush with the cargo area when in a stowed position.

The cargo organiser may comprise one or more frame handles, e.g., provided on the frame. The frame handles may be collapsible, e.g., foldable, relative to the frame. The frame handles may be stowable relative to the frame.

A vehicle, such as an automobile, van or any other vehicle, may comprise the above-mentioned cargo organiser.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
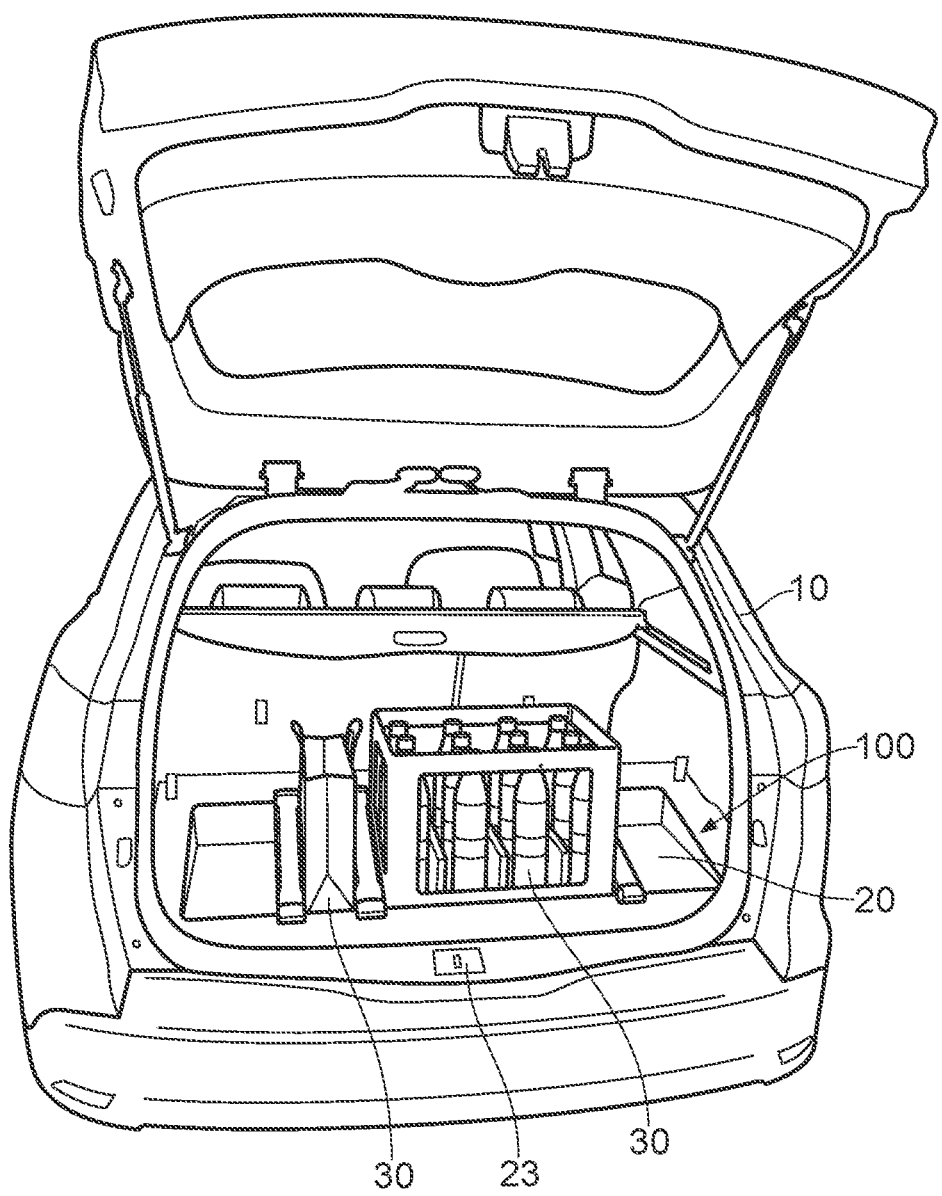
FIG. 1 shows a vehicle comprising a cargo organiser according to a first example of the present disclosure.

With reference to FIGS. 1 to 7, a first example of the present disclosure relates to a cargo organiser 100 for a vehicle 10. FIG. 1 shows the cargo organiser 100 in the cargo area 20, e.g. boot, trunk or any other stowage area, of the vehicle 10. FIG. 1 also shows cargo items 30 being held in place by the cargo organiser 100. Further details of the cargo organiser 100 according to the first example are depicted in FIGS. 2 to 7, which show the cargo organiser 100 located in the cargo area 20.

As depicted in FIGS. 2 to 7, the cargo organiser 100 comprises a frame 110 with an opening 112. The frame 110 may comprise a substantially flat panel 114 and the panel may comprise the opening 112. The panel 114 may be formed of a single piece construction.

The frame 110 may fit in the cargo area 20, for example on the floor of the cargo area, however, it is also envisaged that in an alternative arrangement (not shown), the cargo organiser may also be provided on a side wall of the cargo area. As depicted, the frame 110 may extend between inner cargo area side walls 21, 22. The frame 110 may also extend from a cargo area opening 23 in a direction towards the front of the vehicle, e.g. towards back seats 40, which may form a back wall 24 of the cargo area 20. The frame 110 may extend partially across the cargo area floor towards the back wall 24 so that the frame extends across a portion of the cargo area floor. In an alternative arrangement (not shown), the frame may extend from the cargo area opening 23 to the back wall 24.

The panel 114 may be made from one or more of metal (e.g. aluminium), plastic, composite (e.g. glass or carbon fibre reinforced plastic) or any other suitable material. A rim 116 may be provided about the perimeter of the opening 112. The rim 116 may extend from the opening edge to a point set back from the opening edge. The rim 116 may be made from one or more of metal (e.g. aluminium), plastic, composite (e.g. glass or carbon fibre reinforced plastic) or any other suitable material. An upper surface 118 of the panel 114 may match other surfaces of the cargo area, e.g. the upper surface 118 may be covered with carpet, plastic or any other suitable material. Such a covering may extend to an edge of the rim 116.

Figure 2:
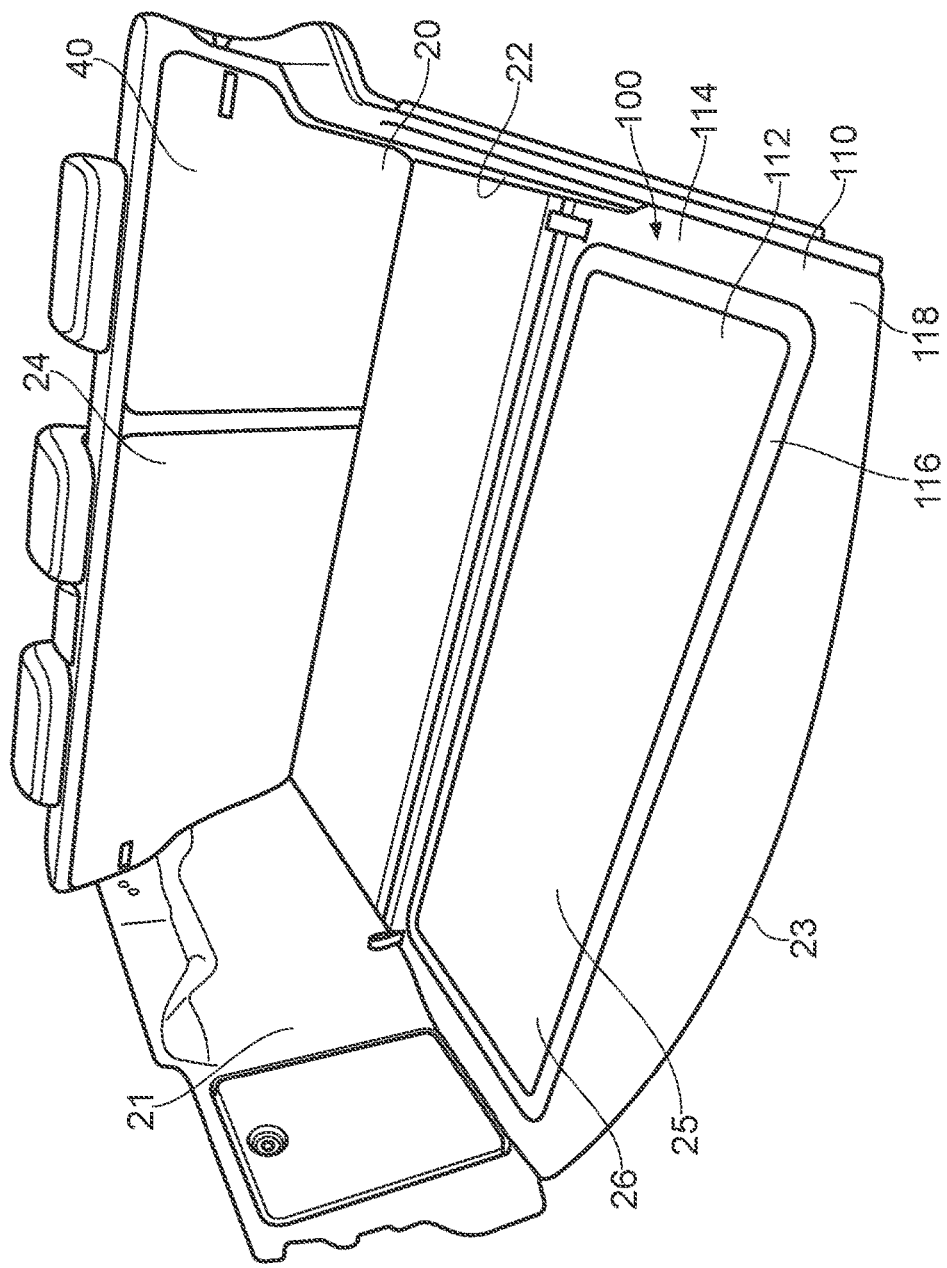
FIG. 2 shows the cargo organiser according to the first example of the present disclosure in a stowed position.
Figure 3:
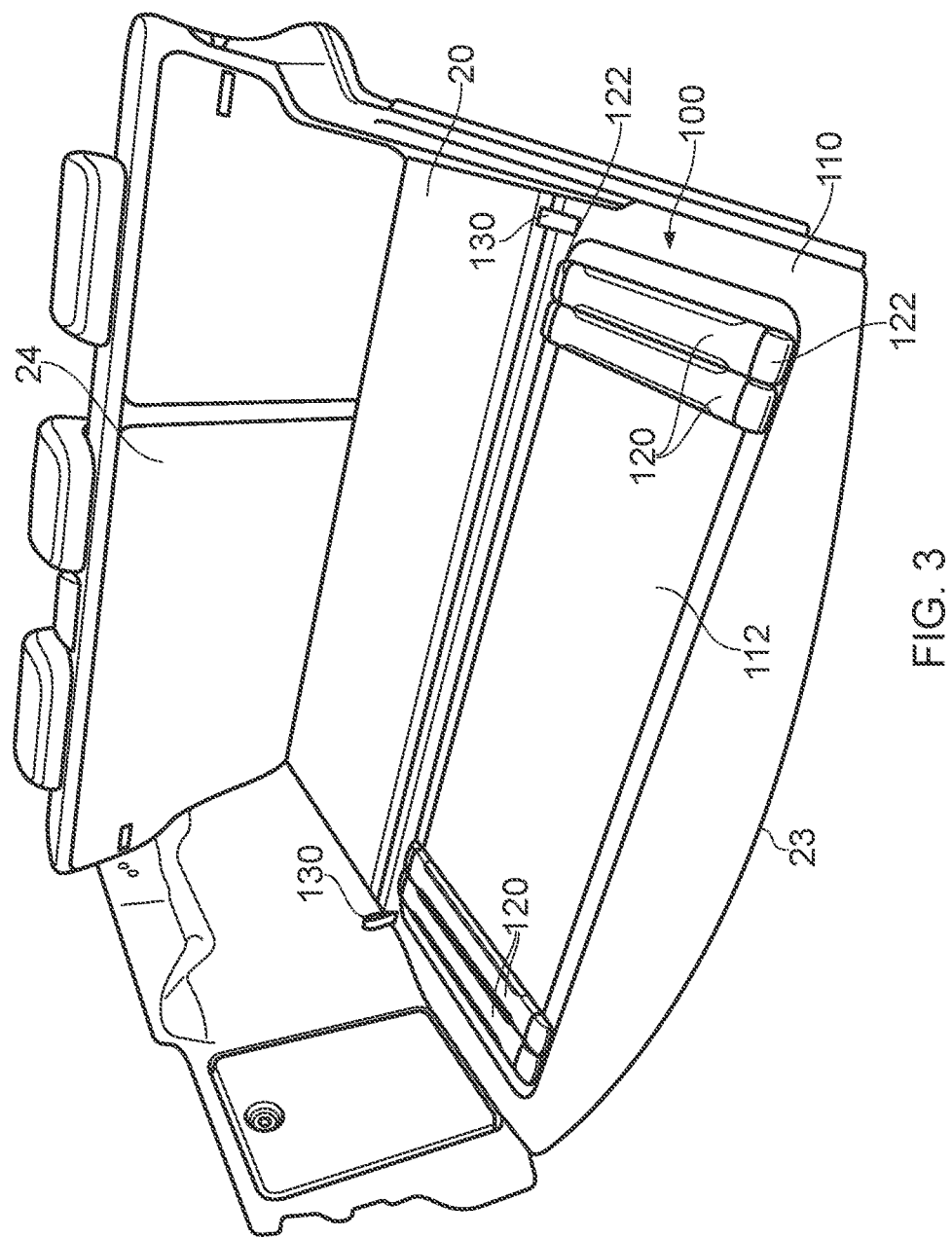
FIG. 3 shows the cargo organiser according to the first example of the present disclosure in the stowed position and with elongate elements installed.
Figure 4:
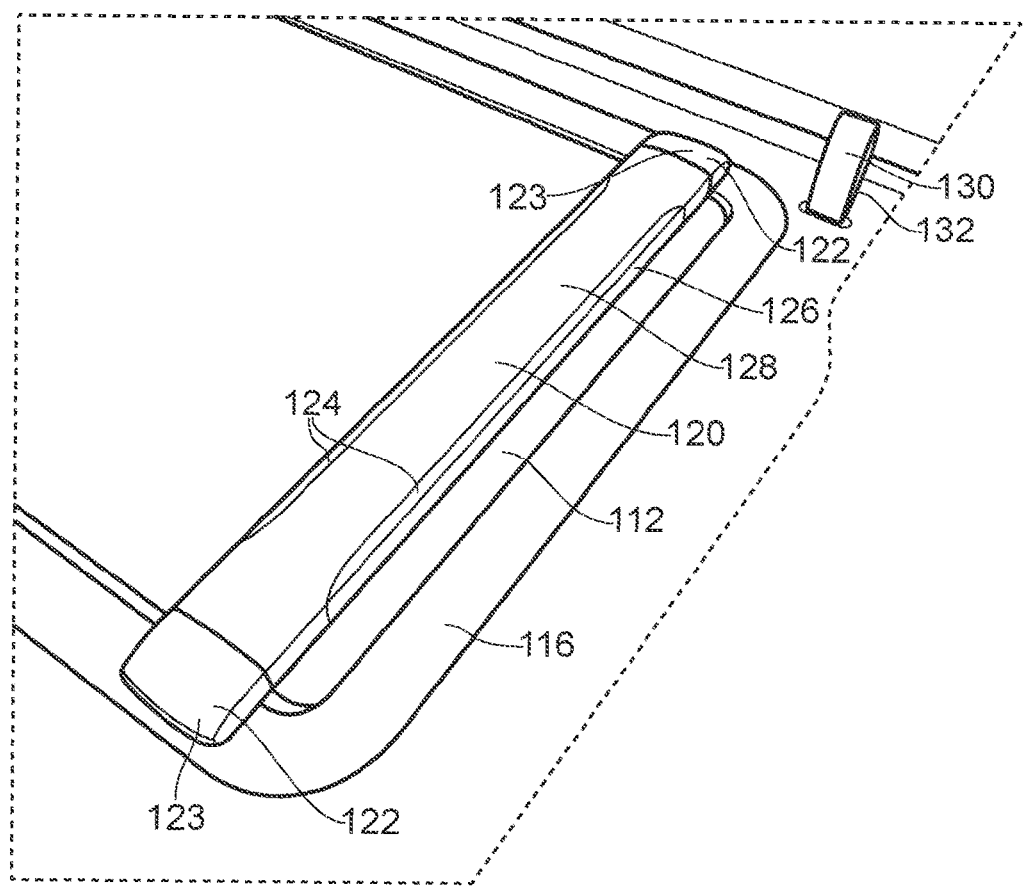
FIG. 4 shows in greater detail a portion of the cargo organiser according to the first example of the present disclosure in the stowed position.

As shown in FIGS. 2 to 4, the panel 114 may be configured so that it may be substantially flush with the cargo area 20 when the cargo organiser 100 is in a stowed position. A recess (not shown) configured to receive the frame 110 may be provided in the cargo area 20. A portion 25 of the cargo area, e.g. surrounded by the recess, may protrude into the opening 112 of the frame 110 when the frame is in the stowed position. An upper surface 26 of the protruding portion 25 may be substantially flush with the upper surface 118 of the frame, when in the stowed position. The protruding portion upper surface 26 may match other surfaces of the cargo area, e.g. the protruding portion upper surface may be covered with carpet, plastic or any other suitable material.

Figure 5:
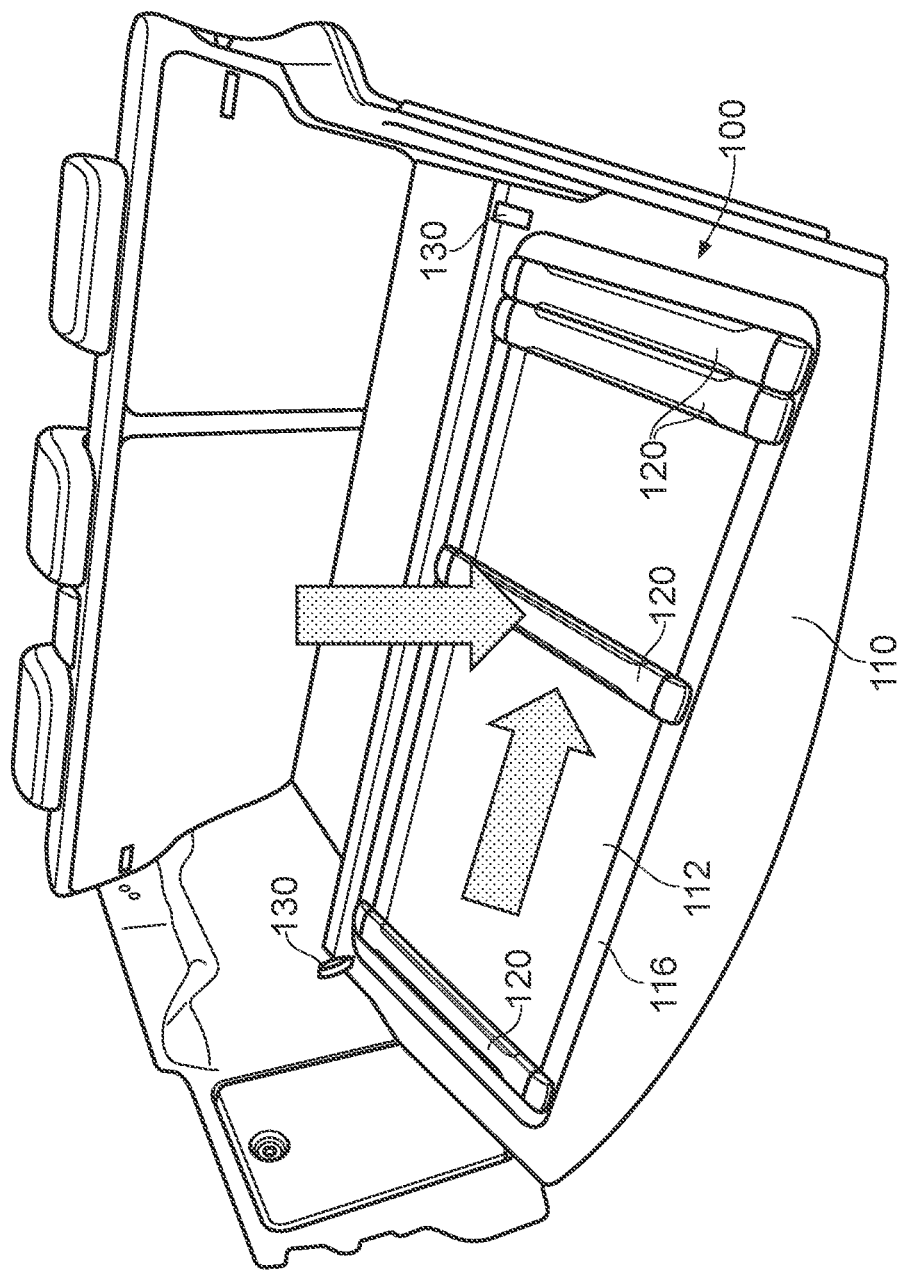
FIG. 5 shows the cargo organiser according to the first example of the present disclosure and depicts the movement of the elongate elements.

Referring now to FIGS. 3 to 5, the cargo organiser 100 further comprises one or more elongate elements 120, which may be positioned so as to extend across the opening 112 defined by the frame 110. As such, the elongate elements 120 may also be described as transverse elements in the sense that they may extend across the opening 112. As depicted, the elongate elements 120, when in place, may extend with a longitudinal axis substantially in a direction from back to front of the vehicle, e.g., from the cargo area opening 23 to the back wall 24 of the cargo area 20. However, in alternative arrangements, the elongate elements may extend in any other direction, e.g., from side wall 21 to side wall 22. The elongate elements 120 may be made from one or more of metal (e.g. aluminium), plastic, composite (e.g. glass or carbon fibre reinforced plastic) or any other suitable material.

The elongate elements 120 may comprise engaging elements 122 that may engage with the rim 116 of the opening 112. The engaging elements 122 may be provided at opposing ends of the elongate elements 120. Each engaging element 122 may comprise a pair of tabs to engage the rim 116. For example, when in an installed position, a first tab 123 may be provided above the rim 116 and a second tab (not shown) may be provided beneath the rim or within a groove of the rim. However, it will be appreciated that other engaging arrangements may be adopted, for example each engaging element 122 may comprise a single tab, which may be inserted into a groove of the rim.

As is depicted in FIG. 5, the elongate elements 120 are slidable with respect to the frame 110, for example in a direction perpendicular to the longitudinal axis of the elongate elements. (FIG. 5 shows the frame in the ramped condition which will be described in more detail below.) The engaging elements 122 are configured so as to permit sliding of the elongate elements 120. The engaging elements 122 may be further configured such that the elongate elements 120 are removable from the frame 110, e.g. by twisting the elongate elements with respect to the frame so that the engaging elements no longer engage the rim 116 of the opening 112.

The elongate elements 120 may comprise a locking mechanism provided at one or each end of the elongate element, thereby allowing the elongate element to be locked in a desired position with respect to the frame. The locking mechanism may be in the form of a clutch, latch or any other type of mechanism. The locking mechanism may be engaged and/or released by virtue of a switch, lever, button or any other mechanism. The locking mechanism may be configured to be releasable when the elongate element and/or ends of the elongate elements are depressed relative to the frame. The locking mechanism may comprise a locking member which engages the rim of the opening. The locking member may engage a surface of the rim, e.g. by virtue of the rim surface being crenulated. The locking member may alternatively or additionally grip the surface, e.g. by virtue of friction. The locking mechanism may comprise a biasing means, e.g. a spring, to bias the locking member into a locked position.

The engaging elements 122 may comprise at least a portion of the locking mechanism. For example, one of the tabs of the engaging elements may be movable so as to selectively grip the rim 116. The movable engaging element tab may be resiliently biased into the locked position, e.g. by virtue of a spring or any other resilient means. In a particular example, the first tab 123 may be movable with respect to the second tab and the remainder of the elongate element 120. The first tab 123 may be biased towards the second tab by biasing means such that the rim is held between the first and second tabs in a gripped position. However, by depressing the elongate element 120 and acting against the biasing means, the first tab may move away from the second tab, thereby releasing the rim from the gripped position. The elongate element 120 may then be moved relative to the frame 110.

As is best shown in FIG. 4, the elongate elements 120 may comprise resilient elements 124 provided along one or more edges of the elongate elements. The resilient elements 124 may extend in a lengthwise direction and may extend across a substantial portion of the elongate elements' length. The resilient elements 124 may be provided on side walls 126 and/or an upper surface 128 of the elongate elements. In the example depicted, there are a pair of resilient elements 124 and each resilient element 124 is provided on an elongate element side wall 126 and extends over a portion of the elongate element upper surface 128. The resilient elements 124 may be formed from rubber, plastic or any other resilient material. It will be appreciated that the elongate elements 120 may act as strips which offer non-slip and/or impact reduction functionality for cargo items placed on or between them.

Figure 6:
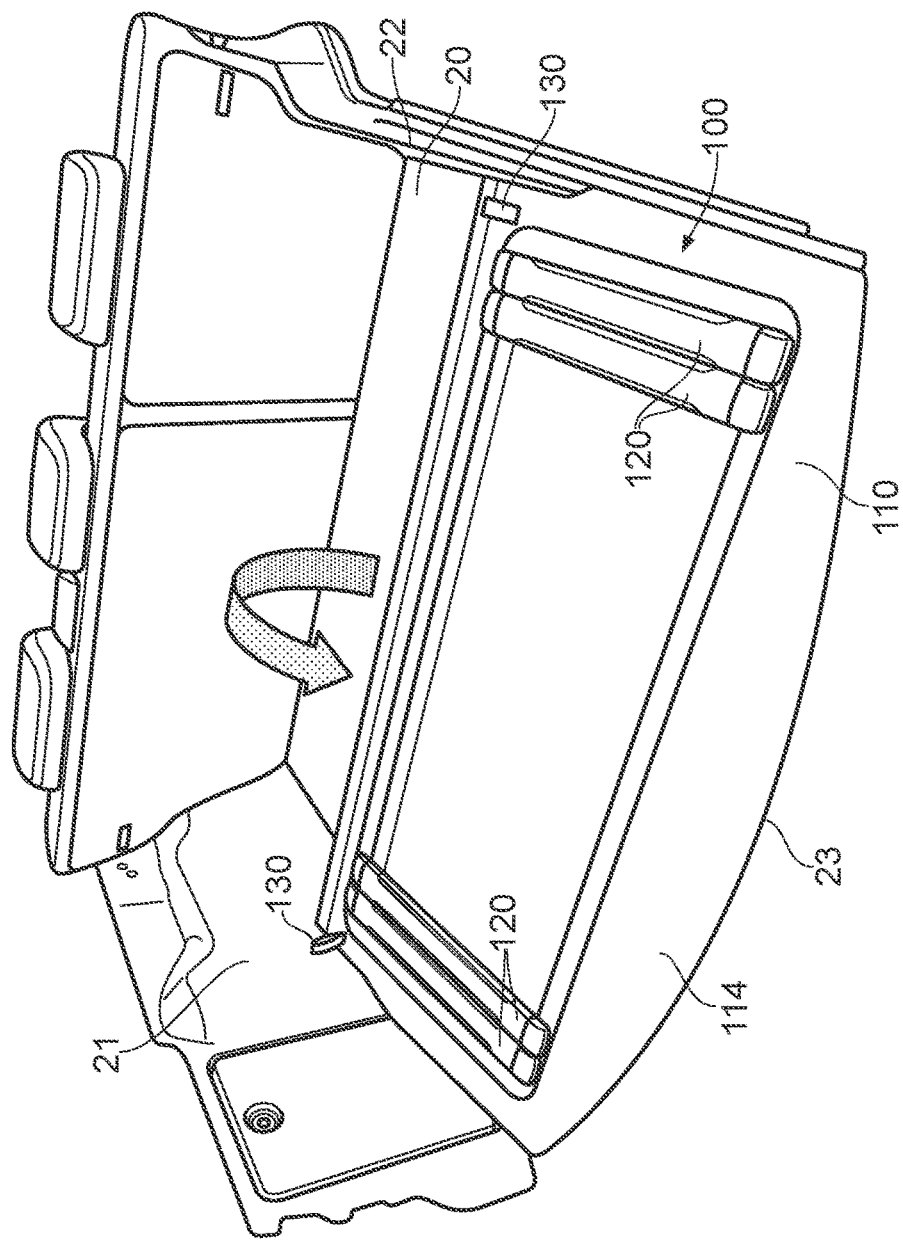
FIG. 6 shows the cargo organiser according to the first example of the present disclosure in a deployed position.

As depicted in FIG. 6, the frame 110 may be movable with respect to the cargo area 20, in particular the frame 110 may be rotatable. As such, the frame 110 may be rotatably coupled to the cargo area 20, e.g., by virtue of a hinge, pivot point or flexible connection, such as a live hinge. The frame may rotate about an axis perpendicular to the longitudinal axis defined by the elongate element. The axis of rotation may be provided at or towards en end of the frame closest to the cargo area opening 23. Accordingly, the end of the frame 110 furthest from cargo area opening 23 may be raised such that the fame 110 is in a ramped position. One or more latching elements (not shown) may be provided to latch the frame in the ramped position. The latching elements may be provided on cargo area side walls 21, 22, a floor of the cargo area and/or on panel 114, e.g. a bottom surface of panel 114. The latching elements may be foldable so as to selectively engage the frame 110 when in the ramped position. For example, the latching element may be foldable with respect to the panel 114, e.g. by virtue of a hinge such as a live hinge. In an alternative arrangement (not shown), the frame 110 may be raisable or raisable and rotatable with respect to the cargo area 20, e.g., by virtue of a four-bar chain mechanism or any other type of mechanism.

Returning to FIG. 4, the cargo organiser 100 may comprise one or more frame handles 130, e.g., provided on the frame. The frame handles 130 may assist in moving the frame relative to the remainder of the cargo area 20. The frame handles 130 may be provided at a point away from the frame hinge, e.g., towards an edge of the frame. A pair of frame handles 130 may be provided at opposing sides of the frame.

The frame handles 130 may be collapsible, e.g., foldable, relative to the frame 110. In the particular example shown, the frame handles 130 comprise eyelet loops 132, which are coupled to the frame 110. The eyelet loops 132 may be made from a flexible material, e.g., a fabric, plastic or any other flexible material. The eyelet loops 132 may readily flex when cargo passes over them and they may be suitably thin so as not to impinge upon the storage space. It is equally envisaged that the frame handles 130 may be formed from a recess in the frame or any other surface feature, such as an opening or protrusion, that would enable an end of the frame to be lifted.

Figure 7:
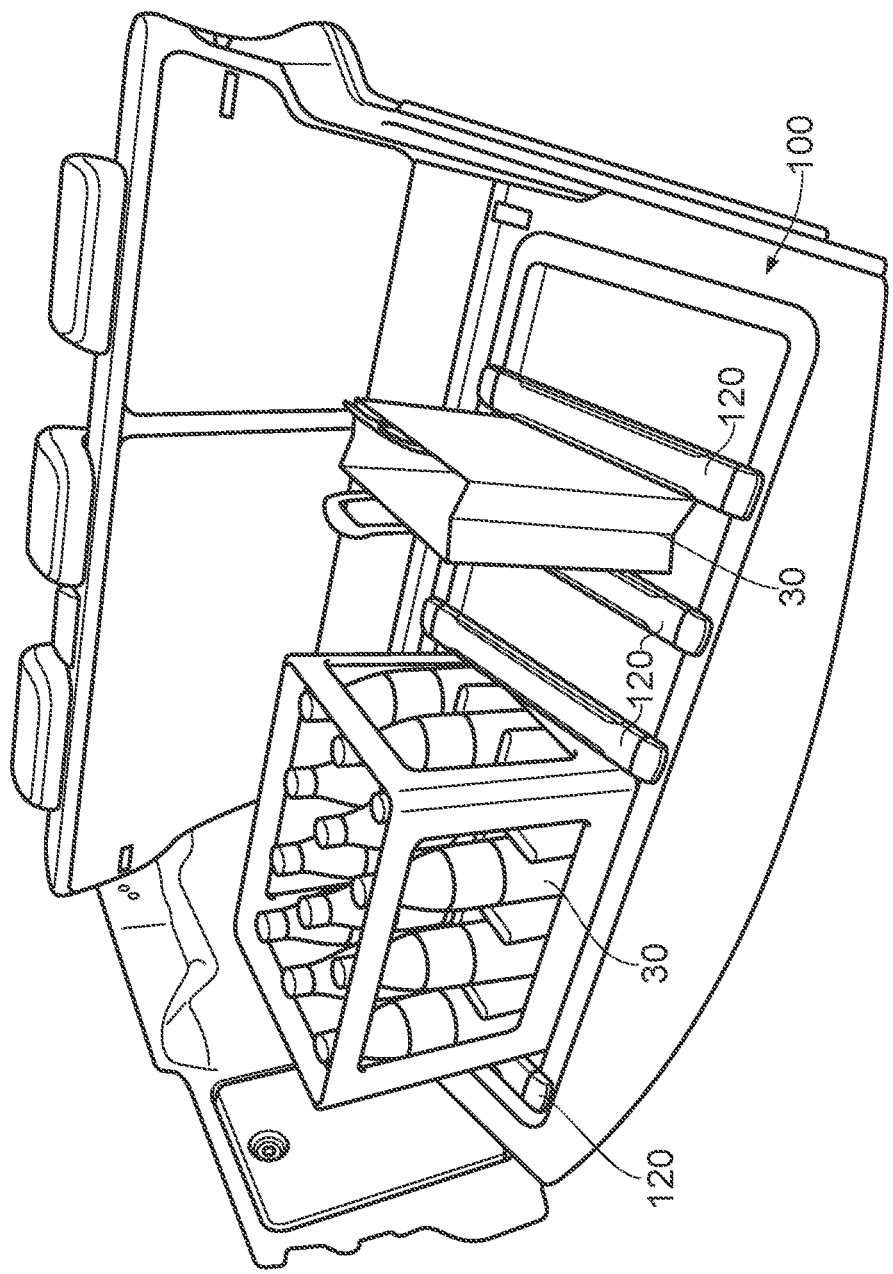
FIG. 7 shows cargo items being held by the cargo organiser according to the first example of the present disclosure.

As shown in FIG. 7, the elongate elements 120 form configurable spacers between which cargo items 30 may be placed. The cargo items 30 may be held between elongate elements or between an elongate element and an edge of the opening 112. The elongate elements 120 may slide laterally across the frame 110 to vary the space between them and in this way the cargo organiser 100 is configurable to the particular size of the cargo items 30.

The elongate elements 120 may limit lateral movement of the cargo items 30 while the vehicle is in motion. The frame 110 may also help to limit fore-aft movement of the cargo items. It will be appreciated that, due to the spatial separation of the frame from the floor of the cargo area, e.g., when the frame is in the ramped position, the elongate elements are at a higher position, which may be better at preventing the cargo items from moving. Both ends of the elongate elements may be in a raised position, e.g., with respect to the cargo area floor. However, in the ramped position, it will be appreciated that one end of the elongate element may be higher than the other end.

In addition, further cargo items may be placed in a position forward of the frame 110, for example when the frame is in the ramped position. The raised edge of the frame 110 and the back wall 24 of the cargo area 20 may restrict movement, e.g., fore-aft movement, of the further cargo items.

It will be appreciated that the resilient elements 124 provided on the elongate elements 120 may help to grip the cargo items 30 and they may help to reduce the likelihood of any damage to the cargo items. Furthermore, the elongate elements 120 may also assist in holding the cargo items when the frame 110 is in the stowed (e.g. flat) position. In such a configuration, the cargo items may be placed between or on top of the elongate elements 120 and the resilient elements 124 may help to limit movement of the cargo items 30.

Although not depicted, further retention devices, such as nets, straps, bungees or hooks, may be attached to the elongate elements 120 and/or the frame 110. Such further retention devices may be attached by virtue of magnetic, mechanical or any other means.

Figure 8:
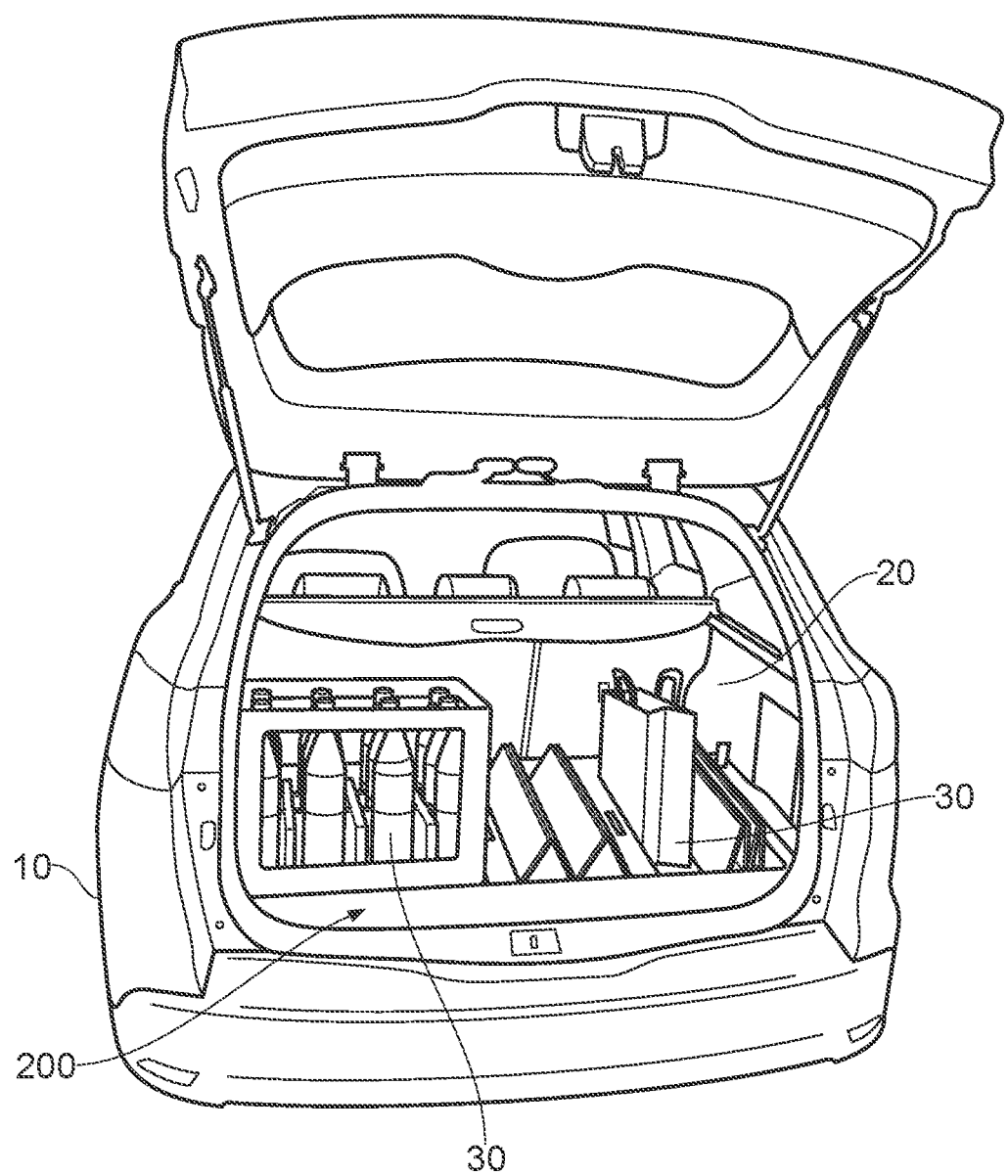
FIG. 8 shows a vehicle comprising a cargo organiser according to a second example of the present disclosure.

With reference to FIG. 8, a second example of the present disclosure relates to a cargo organiser 200 for a vehicle 10. FIG. 8 shows the cargo organiser 200 in the cargo area 20 of the vehicle 10. FIG. 8 also shows cargo items 30 being held in place by the cargo organiser 200. Further details of the cargo organiser 200 according to the second example are depicted in FIGS. 9 to 13, which show the cargo organiser 200 located in the cargo area 20.

The cargo organiser 200 according to the second example is similar to the cargo organiser 100 of the first example. For example, the cargo organiser 200 comprises a movable frame 210 with an opening 212 and one or more elongate elements 220 extending across the opening. The elongate elements 220 are slidable with respect to the opening 212. It will otherwise be appreciated that features described with respect to the first example of the cargo organiser 100 may equally apply to the second example of the cargo organiser 200 and for the sake of brevity will not be repeated here.

Figure 9:
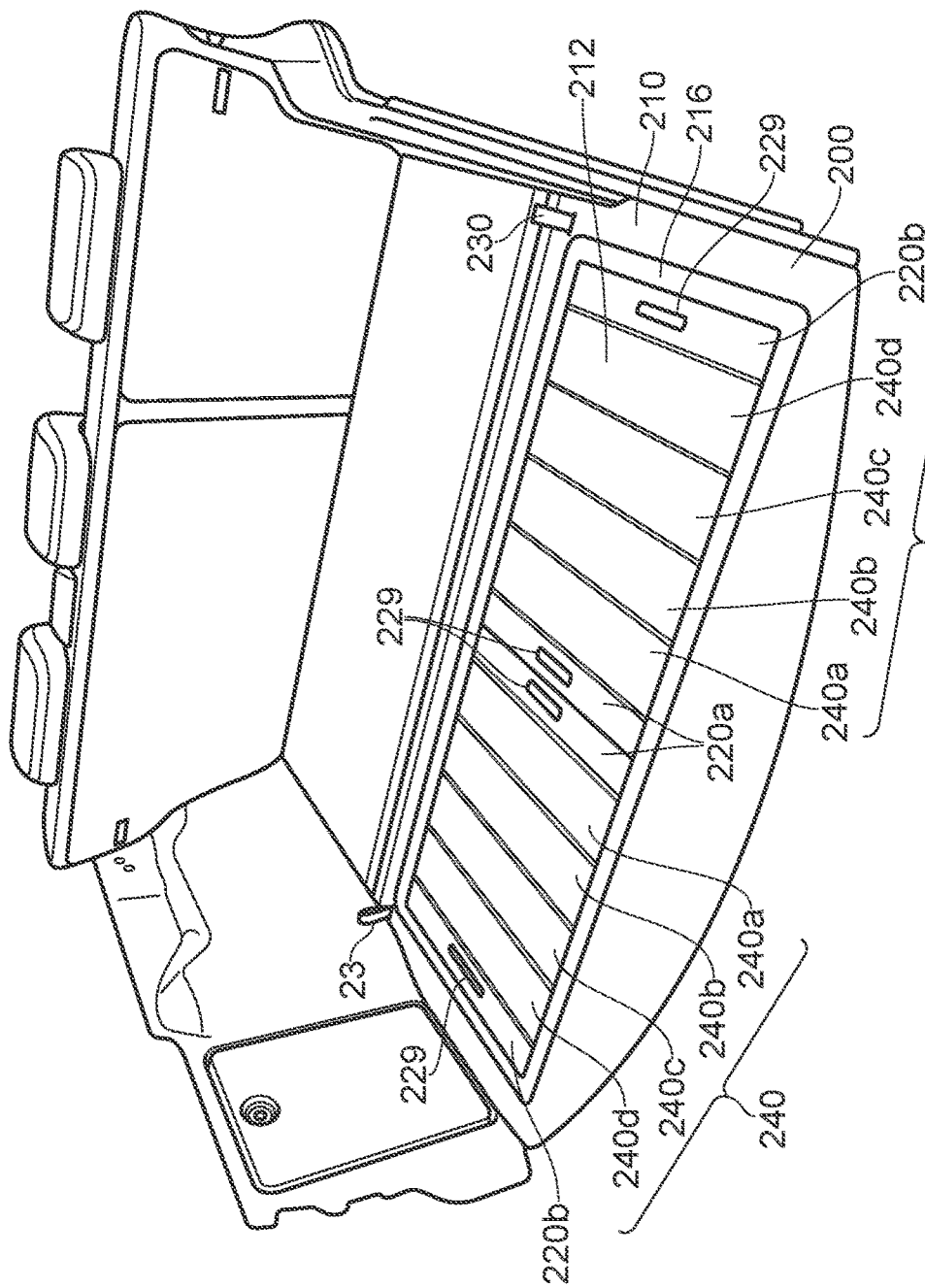
FIG. 9 shows the cargo organiser according to the second example of the present disclosure in a stowed position.
Figure 10:
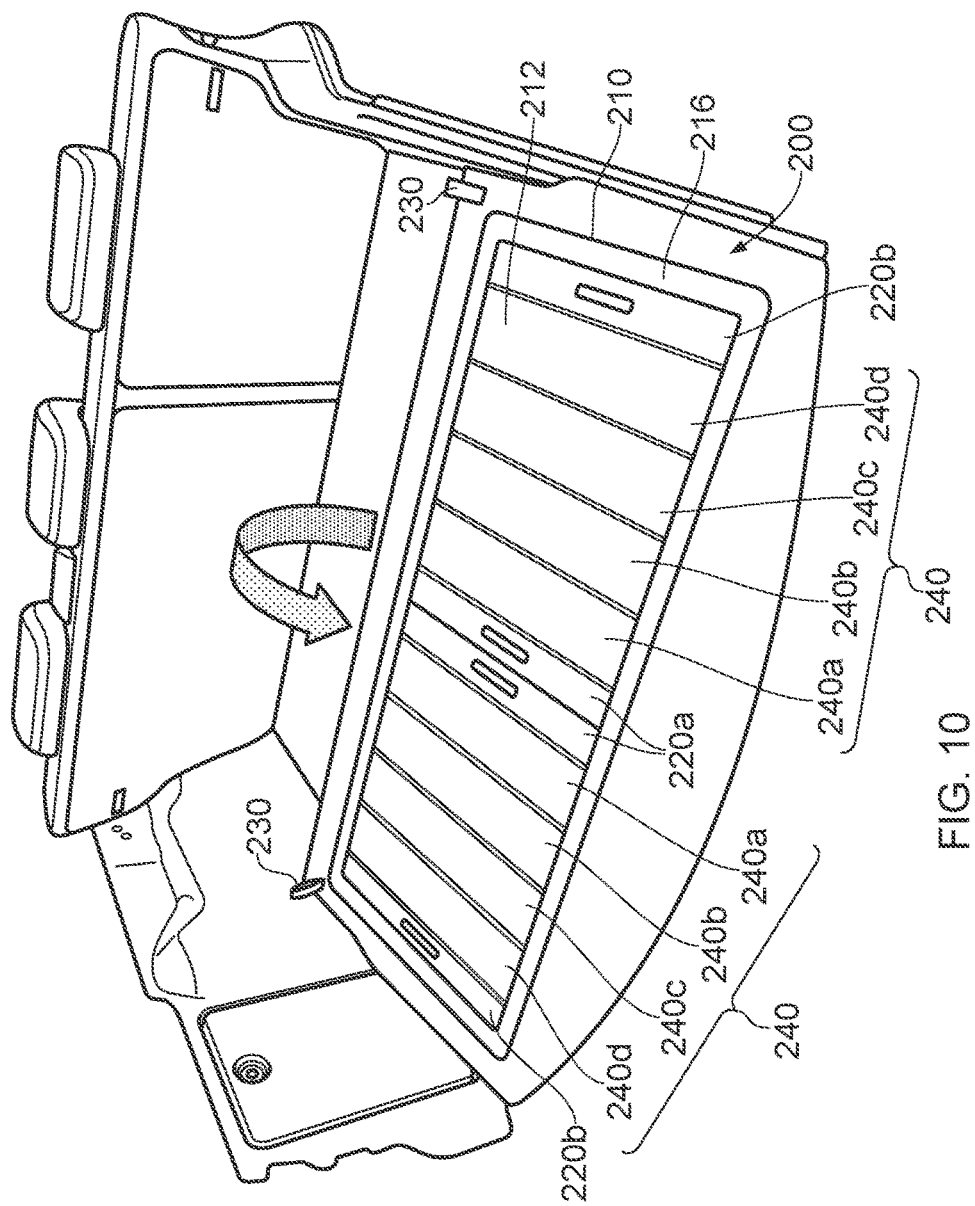
FIG. 10 shows the cargo organiser according to the second example of the present disclosure in a deployed position.
Figure 11:
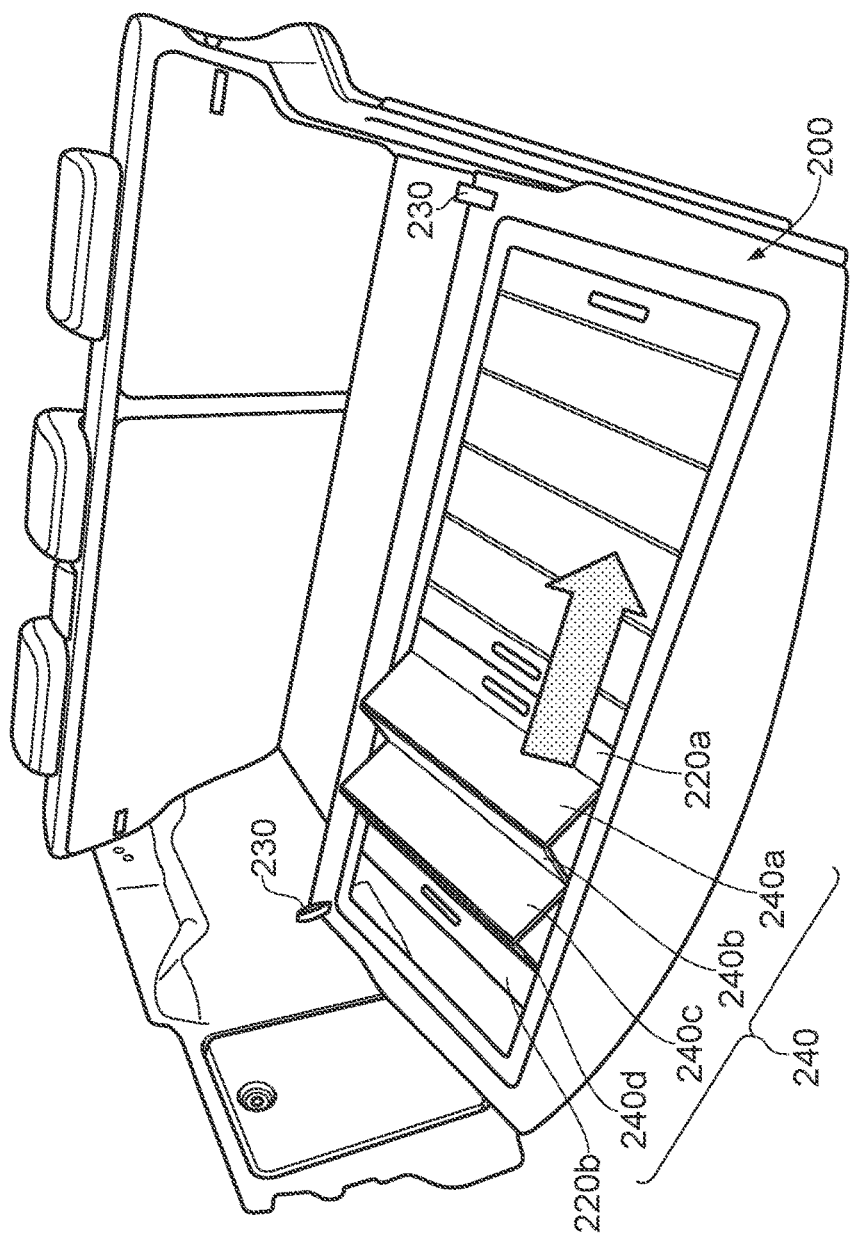
FIG. 11 shows the cargo organiser according to the second example of the present disclosure in the deployed position and depicts the movement of the elongate elements.
Figure 12:
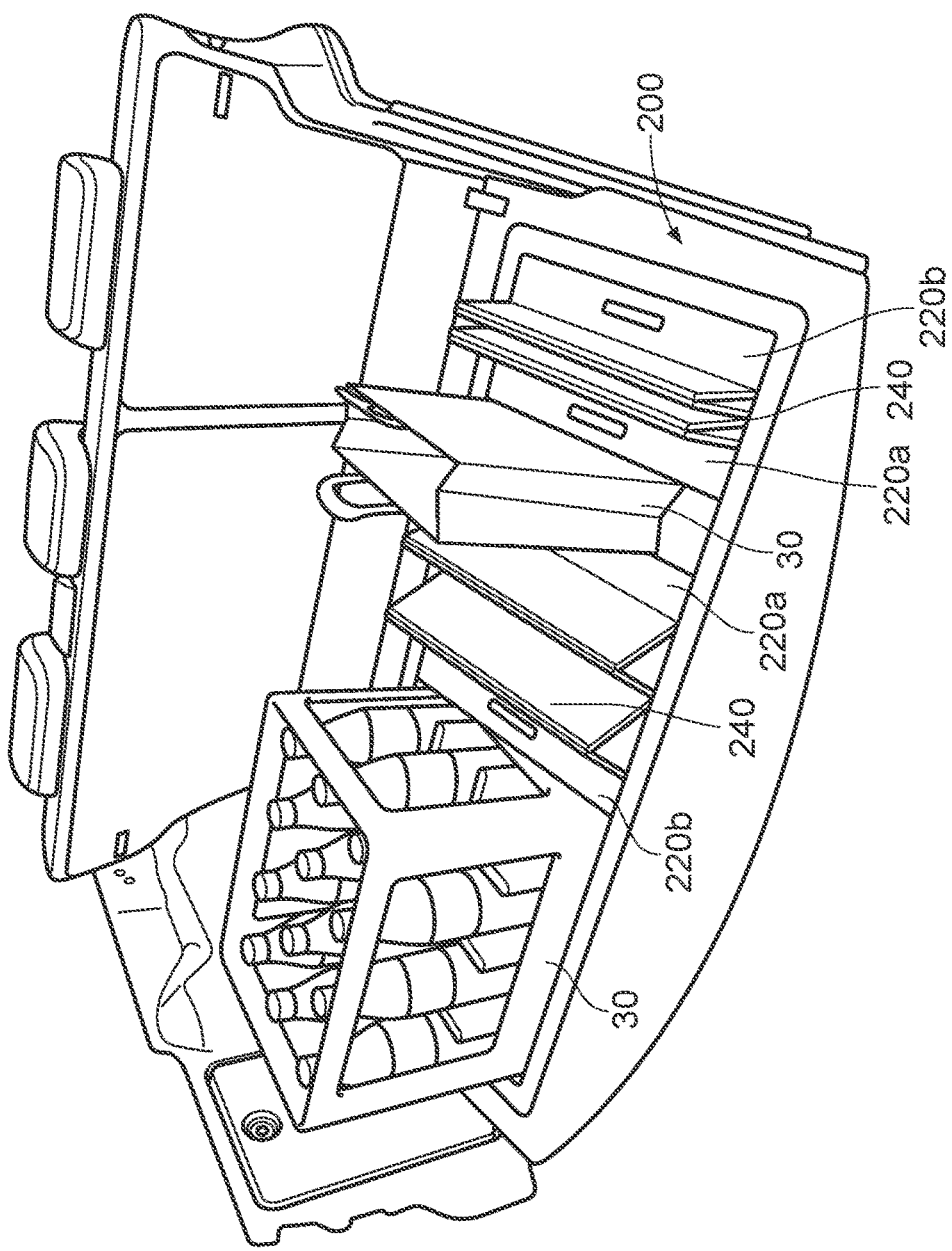
FIGS. 12 and 13 show cargo items being held by the cargo organiser according to the second example of the present disclosure.
Figure 13:
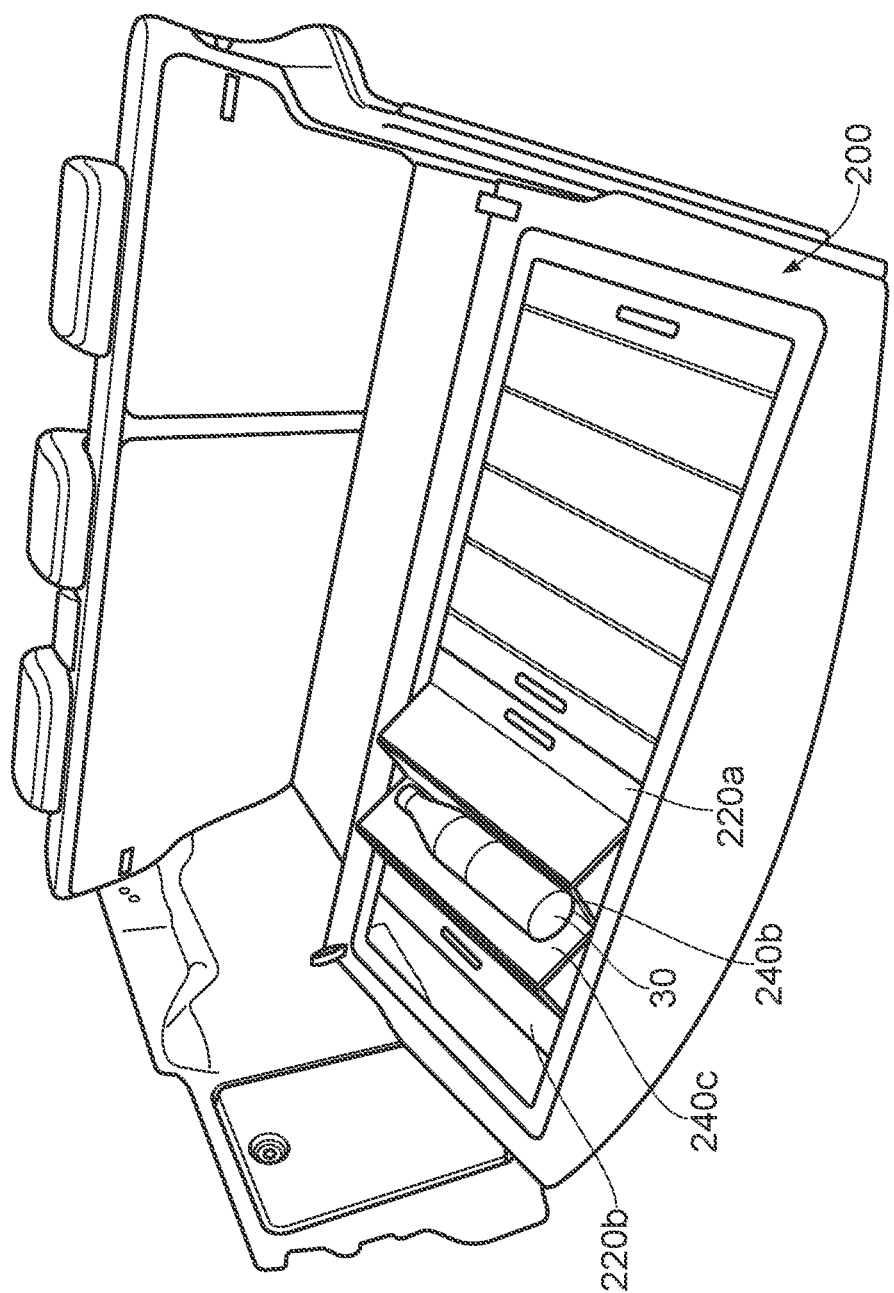

With reference to FIGS. 9 to 13, the cargo organiser 200 of the second example may, in contrast to the first example, comprise a plurality of rotatably coupled panels 240a-240d extending across the frame opening 212. The rotatably coupled panels 240a-240d may be rotatably coupled to one another, e.g., so as to form a concertina panel 240. The rotatably coupled panels 240a, 240d at sides of concertina panel 240 may at their respective sides be coupled, e.g., rotatably, to at least one of the elongate elements 220. For example, a side of the rotatably coupled panel 240a may be rotatably coupled to an elongate element 220a and the opposite side of rotatably coupled panel 240d may be rotatably coupled to an elongate element 220b or a side of the opening 212. In the example shown, the concertina panel 240 is provided between a pair of elongate elements 220a, 220b. In this way the concertina panel 240 and elongate elements 220 together form a foldable panel that may move from a flat position as depicted in FIGS. 9 and 10 to a folded position as depicted in FIGS. 11 to 13.

There may be one or more concertina panels 240 provided across the opening 212 and in the particular example, as shown in FIGS. 9 to 13, there may be two concertina panels 240, each with two associated elongate elements 220. However, in alternative arrangements, there may only be one elongate element per concertina panel. In any event, the concertina panel(s) 240 and elongate element(s) 220 may substantially fill the opening 212 when the concertina panels are in a flat position. Furthermore, as depicted in FIGS. 9 and 10, the elongate elements 220 of the second example may be substantially flush with the opening rim 216 when the concertina panel 240 is in a flat position. A non-slip coating may be provided on the concertina panel 240 and/or elongate elements 220.

The rotatably coupled panels 240a-240d may be rotatably coupled to one another, e.g., by virtue of a hinge, pivot point or flexible connection. Furthermore, the rotatably coupled panels 240a-d may be disposed such that the rotatably coupled panels may rotate with respect to each other about an axis parallel to the elongate element longitudinal axis. For example, in the case of a hinge coupling the rotatably coupled panels together, the hinge may be disposed with an axis of rotation parallel to a longitudinal axis defined by the elongate element.

The elongate elements 220 and concertina panels 240 may be made from one or more of metal (e.g. aluminium), plastic, composite (e.g. glass or carbon fibre reinforced plastic) or any other suitable material.

The concertina panel 240 may comprise a plurality of protrusions (not shown) which extend into a groove of the opening rim 216. The protrusions may be provided at either end of the concertina panel 240. The protrusions may extend in a direction substantially parallel to the longitudinal axis of the elongate elements 220 and rotatably coupled panels 240a-240d. The protrusions may permit sliding and rotation of the rotatably coupled panels 240a-240d. The protrusions may have a substantially circular cross section to facilitate such sliding and rotation. Corresponding protrusion at opposite ends of the panels may have coincident axis, e.g., to facilitate rotation of the panels.

The protrusions may be provided at or between rotatable couplings between the rotatably coupled panels 240a-240d and as such may be coincident with a pivot axis. For example, in the case of a hinge coupling the rotatably coupled panels together, the protrusions may be an extension of a shaft of the hinge. In the case of the protrusions being provided at the rotatable couplings, only alternate rotatable couplings may be provided with such a protrusion and the intermediate rotatable couplings may not be provided with a protrusion. In this way the intermediate rotatable couplings may be free to move out of a plane defined by the frame opening 212, whilst the alternate rotatable couplings with the protrusions are constrained to stay in the plane of the frame opening 212.

In addition to the concertina panel protrusions, the concertina panels may comprise an abutment surface (not shown) extending from ends of the concertina panels and configured to abut a top surface of the opening rim 216. The concertina panel abutment surfaces may extend from a top surface of the concertina panels 240a-240d so as to overhang at least a portion of the rim 216. The concertina panel abutment surfaces may limit downwards movement of the concertina panels and thereby provide additional strength to the concertina panels when in the flat position. Additionally or alternatively, the rim 216 may comprise an abutment surface (not shown) configured to abut a bottom surface of the concertina panels 240a-240d. The rim abutment surface may extend from the rim towards the opening such that the concertina panels 240a-240d may overhang the rim abutment surface. The rim abutment surface may limit downwards movement of the concertina panels and thereby provide additional strength to the concertina panels when in the flat position.

As for the first example, the elongate elements 220 of the second example are slidable with respect to the opening 212. To facilitate such sliding, the elongate elements 220 may comprise one or more protrusions provided at ends of the elongate elements and the elongate element protrusions may extend into the groove of rim 216. (Alternatively, the elongate elements 220 may comprise a groove at each end, which may receive a protruding portion of rim 216.) The elongate elements 220 may be constrained from rotating with respect to the frame and this may be achieved by having two or more laterally spaced apart protrusions at each end of an elongate element and/or an elongate protrusion extending in a direction perpendicular to the longitudinal axis of the elongate elements, e.g., with a substantially rectangular cross-section.

In the example shown, only the rotatable coupling between rotatably coupled panels 240b and 240c may comprise a protrusion into the rim since the rotatable couplings between the rotatably coupled panels 240a, 240d and their respective adjoining elongate elements may already be constrained to remain in the plane of the opening 212, e.g., by virtue of the elongate element protrusions.

The elongate elements may comprise a handle 229. The handle 229 may be formed by an opening or recess in the elongate element, which would enable the elongate element to remain flush with the opening rim 216 and frame 210. The handle 229 may permit a user to slide the elongate elements 220 with respect to the frame.

As for the first example, the elongate elements 220 may lock or grip with respect to the frame 210. Accordingly, the elongate elements 220 may comprise a locking or gripping feature (not shown). The locating or gripping feature may comprises a retractable protrusion that may selectively protrude into the opening rim 216, e.g., to engage a crenulated surface in the rim and/or to frictionally grip the rim. An activating portion of the locking or gripping feature may be provided in the handle 229. Alternatively or additionally, the elongate elements 220 may fit in the opening rim 216 with a tight fit, such that the elongate elements may be moved with a force from the user above a threshold value that is unlikely to be encountered during motion of the vehicle.

As shown in FIG. 10, the frame 210 may be movable, e.g., rotatable, in the same way as that described with respect to the first example. Accordingly, features described in respect of the movable frame of the first example apply equally to the second example. For example, the frame 210 may be rotatably coupled to the cargo area 20, e.g., by virtue of a hinge, pivot point or flexible connection. Also, one or more latching elements (not shown) may be provided to latch the frame in the ramped position. Furthermore, the cargo organiser 200 may comprise one or more frame handles 230 to assist in moving the frame relative to the remainder of the cargo area 20. It will be appreciated that aspects of these features that have been described in respect of the first example, may also apply to the second example of the cargo organiser.

In an alternative arrangement, the frame may not be movable (or it may be movable but not moved) during normal use and the frame may remain in a fixed position. With such an arrangement, the frame opening 212 may reveal a cavity beneath the frame in which cargo items may be placed, e.g., on a floor of the cavity. The cargo items may be held between elongate elements or between an elongate element and an edge of the opening.

As depicted in FIG. 11, when the frame 210 is in the ramped position and at least one of the concertina panels 240 are in an at least partially folded position, a space beneath the opening 212 is revealed.

FIGS. 12 and 13 show the cargo organiser 200 in use. As will be apparent from the drawings, elongate element 220a and/or elongate element 220*b* may be moved to at least partially fold the concertina panel 240 therebetween. Cargo items 30 may then be stored in the spaces in the opening 212 revealed by moving the elongate elements 220. The cargo items 30 may be held between elongate elements or between an elongate element and an edge of the opening 112. In addition, as depicted in FIG. 13, a partially folded position for the concertina panel 240 may be useful for holding cargo items between the rotatably coupled panels 240*b*, 240*c*, e.g., to prevent rolling.

In the case of there being more than one concertina panel, the different concertina panels may be deployed in different positions, for example, with concertina panels with different levels of folding (as shown in FIG. 12) or with one concertina panel remaining flat, while another is at least partially folded (as shown in FIG. 13).

The cargo organiser 200 may also be used with the frame 210 in the stowed position with or without the concertina panels 240 in the flat position. Advantageously, the cargo organiser is substantially flat when the frame is in the stowed position and the concertina panels are in the flat position. The cargo organiser 200 does not therefore interfere with the cargo area 20, e.g., when carrying larger cargo items.

The cargo organisers disclosed herein provide practical and versatile arrangements for the retention of cargo items in a vehicle cargo area, whilst folding away efficiently when not in use. Additionally, the arrangements disclosed herein may also provide secondary non-slip functionality when not in use as well as the option to attach additional storage accessories. The cargo organisers of the present disclosure may also be retrofitted to existing vehicles.

The invention claimed is:

1. A cargo organiser comprising:
   a frame defining an opening; and
   an elongate element extendable across the opening and slidable relative to the frame;
   wherein the elongate element extends between ends and includes a locking mechanism at one of the ends, the locking member configured to lock the elongate element relative to the frame; and
   wherein the locking mechanism is configured to be releasable when the elongate element is depressed relative to the frame between the ends of the elongate element.

2. The cargo organiser of claim 1, wherein the elongate element includes a resilient element extending in a lengthwise direction along a substantial portion of the elongate element and biasing the locking mechanism in a locked position against the frame.

3. The cargo organiser of claim 2, wherein the resilient element extends along an edge of the elongate element.

4. The cargo organiser of claim 2, wherein the resilient member extends along at least one of a side wall and an upper surface of the elongate element.

5. The cargo organiser of claim 1, wherein the elongate element includes a pair of resilient elements disposed along side walls of the elongate element.

6. The cargo organiser of claim 5, wherein the pair of resilient elements extend along an upper surface of the elongate element.

7. The cargo orgniser of claim 1, wherein the frame defines a rim, the one or more elongate elements include a resilient element extending in a lengthwise direction along a substantial portion of the elongate element, and the locking mechanism includes a tab biased against the rim into a locked position by the resilient element.

8. The cargo organiser of claim 1, wherein the locking mechanism grips the frame by friction to lock the position of the elongate element with respect to the frame.

9. The cargo organiser of claim 1, wherein the locking mechanism grips the frame by friction to lock the position of the elongate element with respect to the frame.

10. The cargo organiser of claim 1, further comprising a second locking mechanism at one of the ends opposite the locking mechanism wherein the locking mechanism is configured to be releasable when the elongate element is depressed relative to the frame between the ends of the elongate element.

11. The cargo organiser of claim 10, wherein the elongate element includes a resilient element extending in a lengthwise direction along a substantial portion of the elongate element and biasing the locking mechanism and the second locking mechanism in a locked position against the frame.

12. The cargo orgniser of claim 11, wherein the frame defines a rim and each of the locking mechanism and the second locking mechanism includes a tab biased against the rim into a locked position by the resilient element.

13. The cargo organiser of claim 1, wherein the frame is rotatable relative to a cargo area of the vehicle.

14. The cargo organiser of claim 13, further comprising handles extending from the frame.

\* \* \* \* \*